US007835821B2

United States Patent
Roh et al.

(10) Patent No.: US 7,835,821 B2
(45) Date of Patent: Nov. 16, 2010

(54) ROBOT SERVER FOR CONTROLLING ROBOT, SYSTEM HAVING THE SAME FOR PROVIDING CONTENT, AND METHOD THEREOF

(75) Inventors: Myung Chan Roh, Daejeon (KR); Seung Woog Jung, Daejeon (KR); Choul Soo Jang, Daejeon (KR); Sung Hoon Kim, Daejeon (KR); Joong Bae Kim, Daejeon (KR); Kyeong Ho Lee, Daejeon (KR); Young Jo Cho, Seongnam (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1036 days.

(21) Appl. No.: 11/599,903

(22) Filed: Nov. 15, 2006

(65) Prior Publication Data

US 2007/0112463 A1     May 17, 2007

(30) Foreign Application Priority Data

Nov. 17, 2005   (KR)   ............... 10-2005-0110360
Mar. 3, 2006    (KR)   ............... 10-2006-0020414

(51) Int. Cl.
*G06F 19/00*    (2006.01)
*G05B 19/04*    (2006.01)
(52) U.S. Cl. .................. 700/245; 700/248; 700/246; 709/203; 709/243
(58) Field of Classification Search .......... 700/248
See application file for complete search history.

(56) References Cited

U.S. PATENT DOCUMENTS 6,711,469 B2 *   3/2004   Sakamoto et al. .......... 700/245
6,800,013 B2 *   10/2004  Liu ........................... 446/297
7,047,108 B1 *   5/2006   Rainier et al. .............. 700/245
2003/0095514 A1 * 5/2003 Sabe et al. .................. 370/328
2004/0093219 A1 * 5/2004 Shin et al. .................. 704/275
2004/0098167 A1 * 5/2004 Yi et al. ..................... 700/245
2005/0036649 A1 * 2/2005 Yokono et al. ............. 382/100
2005/0080514 A1 * 4/2005 Omote et al. .............. 700/253
2006/0146776 A1 * 7/2006 Kim .......................... 370/338
2006/0161301 A1 * 7/2006 Kim .......................... 700/245
2006/0195598 A1 * 8/2006 Fujita et al. ............... 709/230
2007/0135967 A1 * 6/2007 Jung et al. ................. 700/248

FOREIGN PATENT DOCUMENTS

| JP | 2004-318862 A | 11/2004 |
| JP | 2004306242 | 11/2004 |
| JP | 2005250878 | 9/2005 |
| KR | 1020040042242 | 5/2004 |
| KR | 1020040043422 | 5/2004 |
| KR | 100497310 | 6/2005 |
| KR | 100499770 | 6/2005 |
| KR | 100530254 B1 | 11/2005 |
| WO | WO 02089382 A2 * | 11/2002 |

* cited by examiner

*Primary Examiner*—Thomas G Black
*Assistant Examiner*—Lin B Olsen
(74) *Attorney, Agent, or Firm*—Ladas & Parry LLP

(57) ABSTRACT

A robot server for controlling a robot, a system for providing content having the same, and a method thereof are provided. The robot server communicating with the robot includes a virtual robot object and a virtual robot object manager. The robot server executes commands that are generated in correspondence to the robot and received from the robot, and controls the robot. The virtual robot object manager generates the virtual robot object corresponding to the robot and activates the virtual robot object when connected to the robot.

22 Claims, 7 Drawing Sheets

US 7,835,821 B2

ROBOT SERVER FOR CONTROLLING ROBOT, SYSTEM HAVING THE SAME FOR PROVIDING CONTENT, AND METHOD THEREOF

CROSS-REFERENCE TO RELATED PATENT APPLICATION

This application claims the benefit of Korean Patent Application No. 10-2005-0110360, filed on Nov. 17, 2005 and Korean Patent Application No. 10-2006-0020414, filed on Mar. 3, 2006, in the Korean Intellectual Property Office, the disclosures of which are incorporated herein in their entirety by reference.

BACKGROUND OF THE INVENTION

1. Field of the Invention

The present invention relates to a server for controlling a robot, a system for providing content having the same, and a method thereof, more particularly, to a server for remotely controlling a robot which has no processing ability or less of processing ability for itself, a system for providing content for the robot, and a method thereof.

2. Description of the Related Art

Until now, most robots have had various sensors and their own processors to provide a music service or a streaming service such as fairy tale narration. They also provide content of services such as speech recognition, image recognition, or navigation requiring a high capacity processor. Since robots providing all of these services are expensive, they have less of practical use.

The conventional network-based robots previously store content to be provided in a home server or home network based server such as a personal computer for home use, and then provide the content. However, the content to be provided has not only to be previously stored, but also hardly to be provided correspondingly to various robots. In addition, since the robots directly communicate with the home server for providing the content, the robots cannot cope properly with content that damages their hardware.

SUMMARY OF THE INVENTION

The present invention provides a robot server for remotely controlling a robot that have no or less of ability to provide its own service, and providing content for a robot, a system including the same, and a method thereof.

According to an aspect of the present invention, there is provided a robot server communicating with a robot, the robot server including: a virtual robot object arranged to execute commands that are generated in correspondence to the robot and received from the robot, and control the robot; and a virtual robot object manager arranged to generate the virtual robot object corresponding to the robot and activate the virtual robot object when connected to the robot.

According to another aspect of the present invention, there is provided a content service system for providing content service for a robot, the system including: a content server arranged to store a plurality of contents and transmit a requested content data when the content service is requested; and a robot server arranged to receive a request for the content service from the robot, connect to the content server, receive the requested content data, and transmit the content data to the robot.

According to another aspect of the present invention, there is provided a method of providing a content service, the method including: activating a virtual robot object corresponding to a robot when a content service is requested; and obtaining content requested through the virtual robot object and transmitting the content to the robot.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, preferred embodiments of the present invention will be described in detail with reference to the attached drawings.

Figure 1:
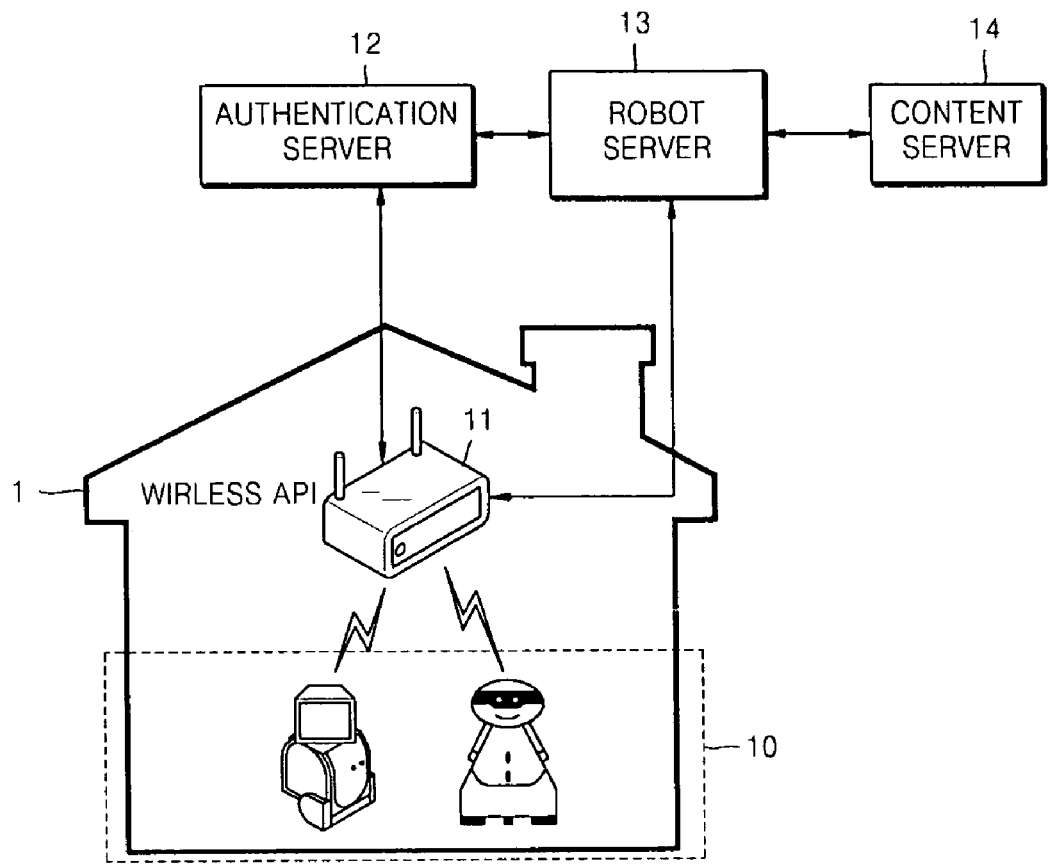
FIG. 1 is a schematic diagram of a configuration of a system for providing content according to an embodiment of the present invention.

FIG. 1 is a schematic diagram of a configuration of a system for providing content according to an embodiment of the present invention. Referring to FIG. 1, a system for providing content includes a robot 10 located in a house 1 having a wireless access point (AP) 11, an authentication server 12 for communicating with the robot 10 through the wireless AP, a robot server 13, and a content server 14. The authentication server 12, the robot server 13, and the content server 14 are preferably wired.

The authentication server 12 authenticates the robot 10 connected to the robot server. The robot server 13 analyzes and executes input user commands, and manages and controls the robot 10 through an embedded virtual robot object. The content server 14 provides content to the robot 10 through the robot server 13.

The robot 10 can be a middle or low priced robot that cannot provide its own content service, or a high priced robot capable of providing its own content service.

Here, a single robot server 13 may manage one or more robots 10. The robot server 13 may include one or more servers, and the content server 14 may also include one or more servers.

Figure 2:
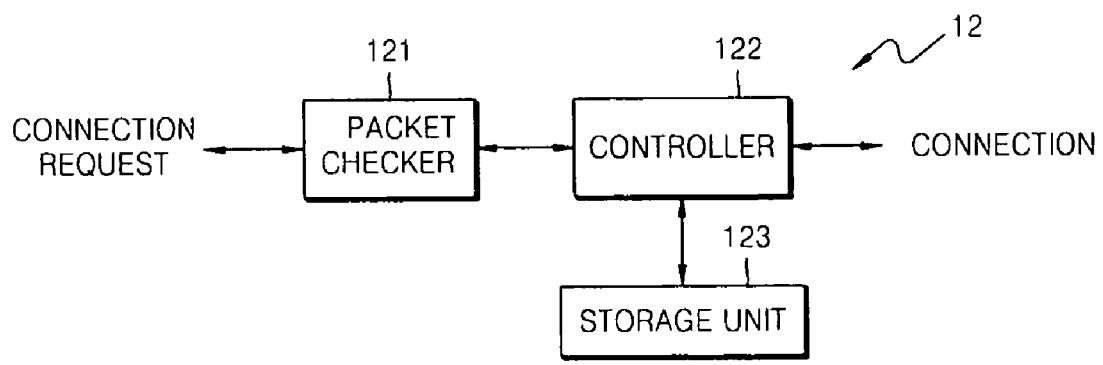
FIG. 2 is a detailed block diagram of an authentication server illustrated in FIG. 1.
Figure 3:
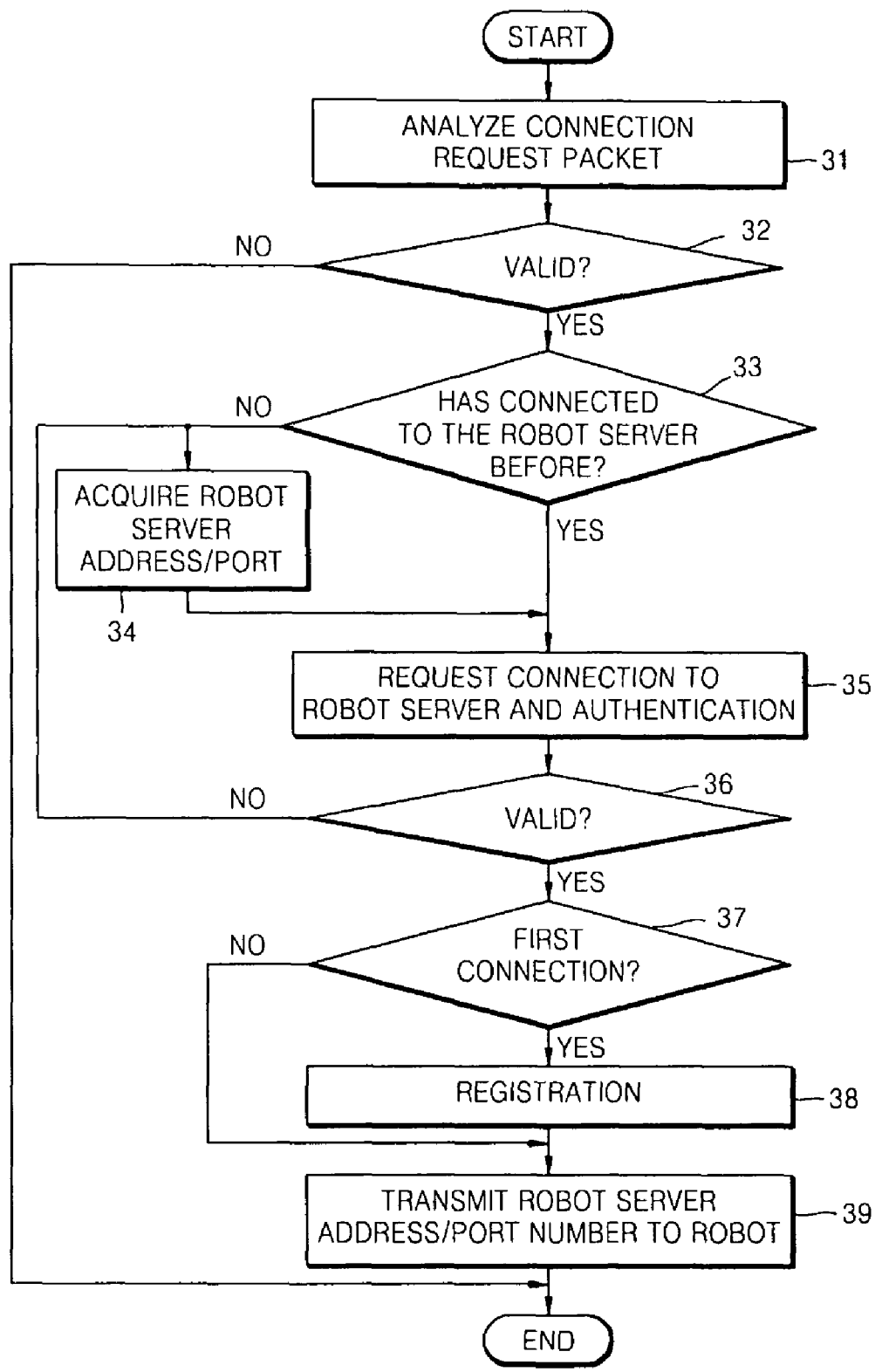
FIG. 3 is a flowchart of an authentication procedure performed in the authentication server.

FIG. 2 is a detailed block diagram of the authentication server 12 illustrated in FIG. 1. The authentication server 12 includes a packet checking unit 121, a controller 122, and a storage unit 123. FIG. 3 is a flowchart of authentication procedure performed in the authentication server 12.

First, when the packet checking unit 121 receives a connection request packet for connection to the robot server 13 from the robot 10, the packet checking unit 121 analyzes the connection request packet (operation 31).

Figure 4:
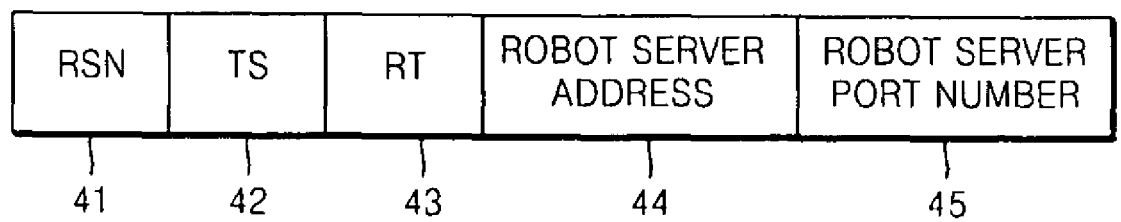
FIG. 4 shows a structure of a connection request packet.

FIG. 4 shows a structure of a connection request packet. The connection request packet includes a robot serial number (RSN) field 41 for representing the serial number of the robot 10, a time stamp (TS) field 42 for representing the connection request time, a request type (RT) field 43 for representing the type of the connection request, a robot server address field 44, and a robot server port field 45.

When requesting a connection, the connection request packet is transmitted with the robot server address field 44 and the robot server port field 45 empty.

The packet checking unit 121 determines validity of the received connection request packet by checking each field of the received connection request packet has a proper value (operation 32). When the received connection request packet is determined to be valid, the controller 122 determines whether the robot 10 has been connected to the robot server 13 before (operation 33). In operation 33, the controller 122 reads the robot serial number from the RSN field 41 of the connection request packet and checks whether the read RSN value is included in a robot connection table (not shown) stored in the storage unit 123.

When the robot 10 has not been connected to the robot server 13 before, the controller 122 obtains an address and a port number of the robot server to be connected from the robot server list table (not shown) stored in the storage unit 123 (operation 34).

In operation 35, the controller 122 is connected to a corresponding robot server 13 using an address and a port number of the robot server 13 acquired from a robot connection table when the robot 10 has been connected to the robot server 13 before, or using an address and a port number of the robot server 13 acquired from the robot server list table when the robot 10 is connected to the robot server 13 for the first time, and then requests authentication (operation 35).

Figure 5:
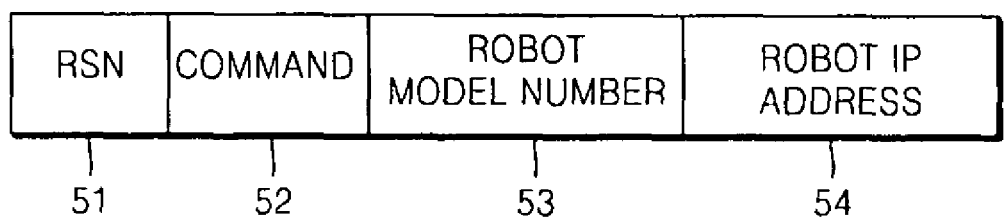
FIG. 5 shows a structure of a packet used when authentication is requested.

FIG. 5 shows a structure of a packet used in the authentication request. Referring to FIG. 5, the authentication packet includes an RSN field 51, a command field 52 for representing an authentication request command, a field 53 for representing the model number of the robot specified by the RNS field 51, and a field 54 for representing the IP address of the robot.

When the robot is authenticated by the robot server 13 (operation 36), in case of the first connection, the controller 122 additionally registers the RSN of the robot 10, and the address and port number of the robot server 13, in the robot connection table in order to connect the robot to the same robot server 13 in the next connection (operation 38). Next, the controller 122 fills the robot server address field 44 and the robot server port field 45 with the corresponding values in the packet shown in FIG. 3 and transmits to the robot 10 (operation 39). Then, the robot 10 communicates with the robot server 13 using the address and the port number of the corresponding robot server 13.

When the robot 10 is not authenticated by the robot server 13 in operation 36, the robot server 13 to be connected to is not considered to operate. Accordingly, the controller 122 proceeds to operation 34 to obtain an address and port number of another robot server from the robot server list table, and then proceeds to operation 35.

Figure 6:
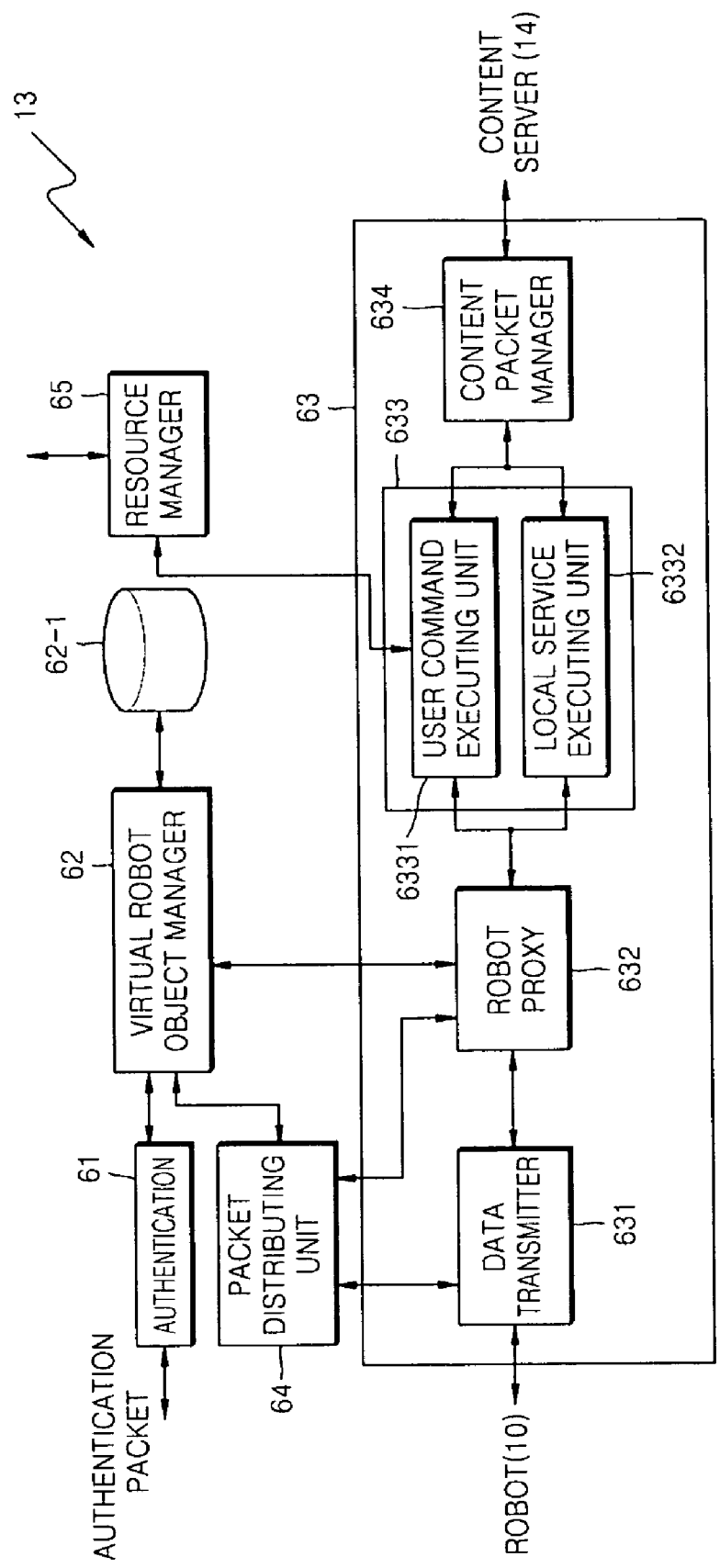
FIG. 6 is a detailed block diagram of a robot server.

FIG. 6 is a detailed block diagram of the robot server 13.

Referring to FIG. 6, the robot server 13 includes an authentication unit 61, a virtual robot object manager 62, a virtual robot object 63, a packet distributing unit 64, and a resource manager 65.

The authentication unit 61 receives and analyzes an authentication packet transmitted from the controller 122 of the authentication server 12 to authenticate the robot 10 that presently requests a connection.

Figure 7:
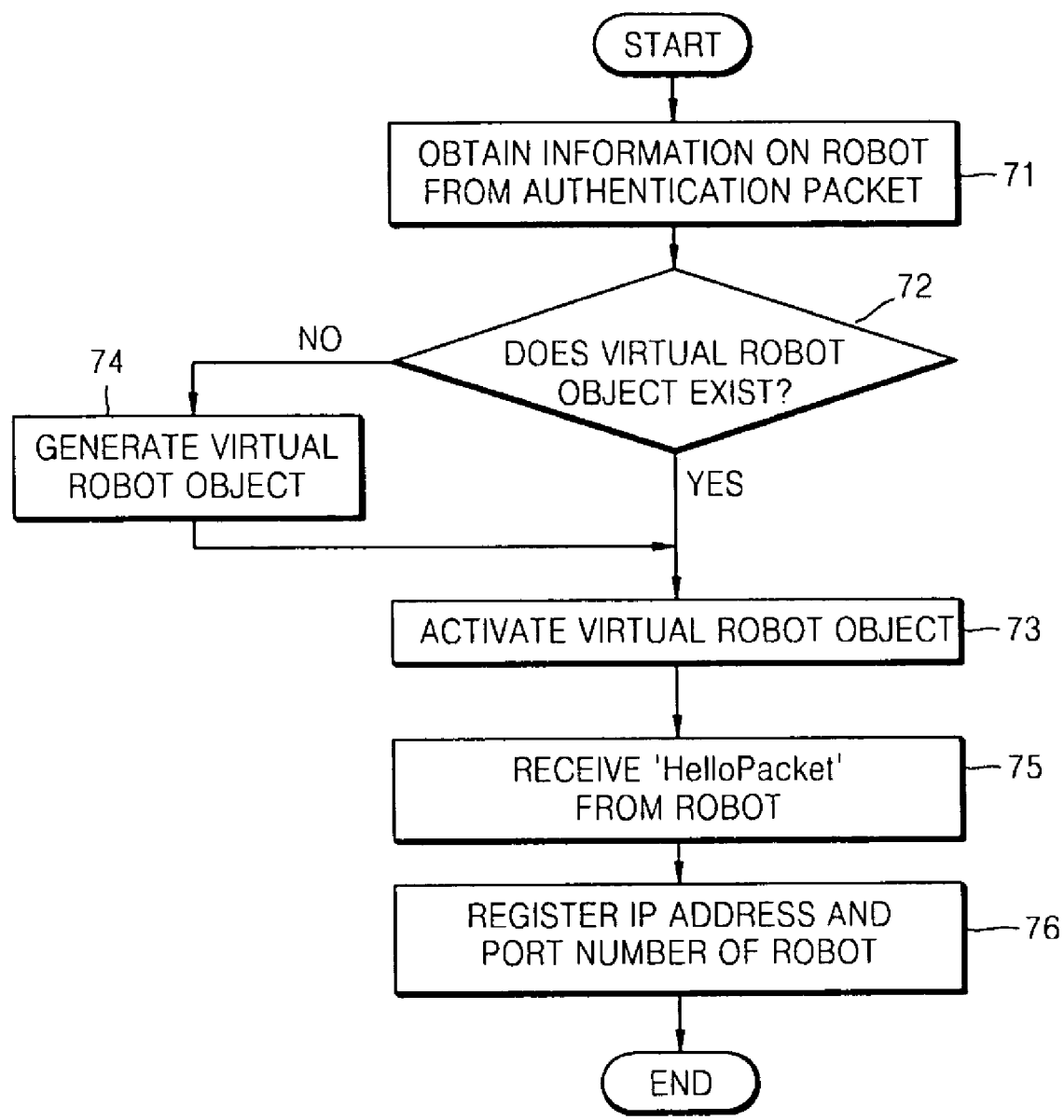
FIG. 7 is a flowchart of an authentication procedure performed by the authentication unit of FIG. 6.

FIG. 7 is a flowchart of an authentication procedure performed by the authentication unit of FIG. 6.

The authentication unit 61 obtains information on the robot 10 from the authentication packet received from the controller 122 (operation 71). The authentication unit 61 transmits the information to the virtual robot object manager 62, and the virtual robot object manager 62 determines whether a virtual robot object corresponding to the robot 10 exists (operation 72). When the virtual robot object exists, the virtual robot object manager 62 activates the corresponding virtual robot object 63 (operation 73). When the virtual robot object does not exist, the virtual robot object manager 62 generates the virtual robot object 63 corresponding to the robot 10 (operation 74) and activates the virtual robot object 63 (operation 73).

The virtual robot object 63 includes a data transmitting unit 631, a robot proxy 632, a virtual object executing unit 633, and a content packet manager 634. The virtual object executing unit 633 includes a user command executing unit 6331 and a local service executing unit 6332. The procedure for generating the virtual robot object 63 is as follows.

First, the virtual robot object manager 62 allocates a synchronous/asynchronous communication port to the virtual object robot 63 for communicating with the robot 10. Next, the virtual robot object manager 62 reads the robot proxy 632 for a communication protocol and data processing with the corresponding robot 10 from a storage unit 62-1 and installs the robot proxy 632 to the virtual object robot 632. Since various robots with corresponding communication protocols and data processing methods are connected, the robot proxy 632 corresponding to the type of the connected robot 10 is configured as an element of the virtual robot object 63 and is read from the storage unit 62-1 with reference to the robot model obtained from the authentication server 12. Information on the robot proxy 632 is stored in the storage unit 62-1 in a text type of an XML document.

The virtual robot object manager 62 installs the data transmitting unit 631 for communication through the allocated synchronous/asynchronous communication port in the virtual robot object 63. The virtual robot object manager 62 may further install the content packet manager 634 for storing and managing content data received from the content server 14 in a packet unit, the user command executing unit 6331 for analyzing and executing user commands, and the local service executing portion 6332 for an internal status management of the virtual robot object 63, a robot protection from obstacles or an emotion-based service for users when there is no user command, in the virtual robot object 63.

The virtual robot object manager 62 manages the virtual robot object 63 and transmits information of lifecycle management of various virtual robot objects, user information or installation information to the virtual robot object 63. Here, the lifecycle indicates that when the robot is powered on, the corresponding virtual robot object 63 is maintained, and when the robot is powered off, the corresponding virtual robot object 63 is maintained for a predetermined time or removed.

When the virtual robot object 63 is activated, the authentication unit 61 notifies the authentication server 12 that the robot 10 is authenticated. After the robot 10 is authenticated, the virtual robot object 63 receives HelloPacket, a connection packet according to the first connection from the robot 10 (operation 75). The virtual robot object 63 prepares a service by registering the IP address and port number of the robot 10 from HelloPacket received from the robot 10 (operation 76).

The robot proxy 632 communicates with the robot 10 through the data transmitting portion 631. The synchronous/non-synchronous communication channel can be configured with various protocols such as Transmission Control Protocol/Internet Protocol (TCP/IP), User Datagram Protocol/Internet Protocol (UDP/IP), Java Remote Method Invocation (RMI), or Common Object Request Broker Architecture (CORBA), etc. The synchronous communication is used for a seamless operation of the robot in a move, speech or image display, and the asynchronous communication is used for one-sided transmission such as an urgent system command or sensor information.

In the asynchronous communication, the data transmitting portion 631 receives the asynchronous data from the robot 10, obtains information on the virtual robot object 63 corresponding to the robot 10 from the virtual robot object manager 62, and transmits the asynchronous data to the robot proxy 632 of the corresponding virtual robot object 63. The robot proxy 632 analyzes the received asynchronous data and performs an operation corresponding to the analyzed asynchronous data.

A method of transmitting the asynchronous data from the packet distributing unit 64 to the robot proxy 632 is performed by calling a function corresponding to the virtual robot object 63 or by generating an event. As for the asynchronous data received from the robot 10, either of two schemes of transmission by the robot 10 can be adopted. One is that the robot transmits the asynchronous data to the robot server 13. The other is that the robot server 13 requests the robot to transmit the asynchronous data and then receives them.

Since methods of processing synchronous or asynchronous data can differ according to a protocol defined by the robot, in the present invention, the robot proxy 632 manages a communication protocol with the robot 10 and data processing.

The virtual object executing unit 633 receives commands input by a user from the robot 10, analyzes and executes the received commands. The virtual object executer 633 also protects the robot 10 from the obstacles and performs the emotion-based service for the user.

When the user commands are input by speech, the user command executing unit 6331 transmits speech command data by connecting to an external Automatic Speech Recognition (ASR) server through an ASR function of the resource manager 65, receives a string or symbols for the speech commands, analyzes and executes the string or symbols of the speech commands. When the user commands are input as a string, the user command executing unit 6331 converts the string into speech data through a Text-To-Speech (TTS) function of the resource manager 65 and transmits the speech data to the robot 10.

The local service executing unit 6332 also transmits an obstacle avoidance command to the robot 10 according to sensing data received from the robot 10. The robot 10 includes various sensors, and transmits data received from the sensors to the local service executing unit 6332. Until now, most robots have detected and avoided obstacles using data from their own sensors, and have thus needed high performance processors. Accordingly, low priced robots which do not have high performance processors need an external device that functions as a brain. In the present invention, obstacle detection and avoidance functions for the low priced robot are performed through the robot server 13.

In addition, the local service executing unit 6332 can provide a service based on user emotion. Until now, most robots have provided a service that the user wants according to a user command. However, according to the present embodiment, at a predetermined time in a day, or after a predetermined time period has passed without a user command, the robot 10 analyzes user intention and provides a service suited for the user. For example, there may be provided an intellectual service such as a service for playing a user's favorite music by receiving the user's favorite music from the content server 14 at three p.m., without waiting for a user command. In order to provide the intellectual service, the robot 10 analyzes the user's intention by learning the habits and preferences of the user based on the previously executed user commands or history. The learning may be to store a pattern that a user command is input at an identical time period for several days and to enable a service according the stored pattern without the user command.

When the user command executing unit 6331 or local service executing unit 6332 is connected to the content server 14, receives content data, and provides the content data to the robot 10, the content packet manager 634 temporarily stores the content data in a packet unit to prevent overflow in accordance with the status of the communication channel.

Figure 8:
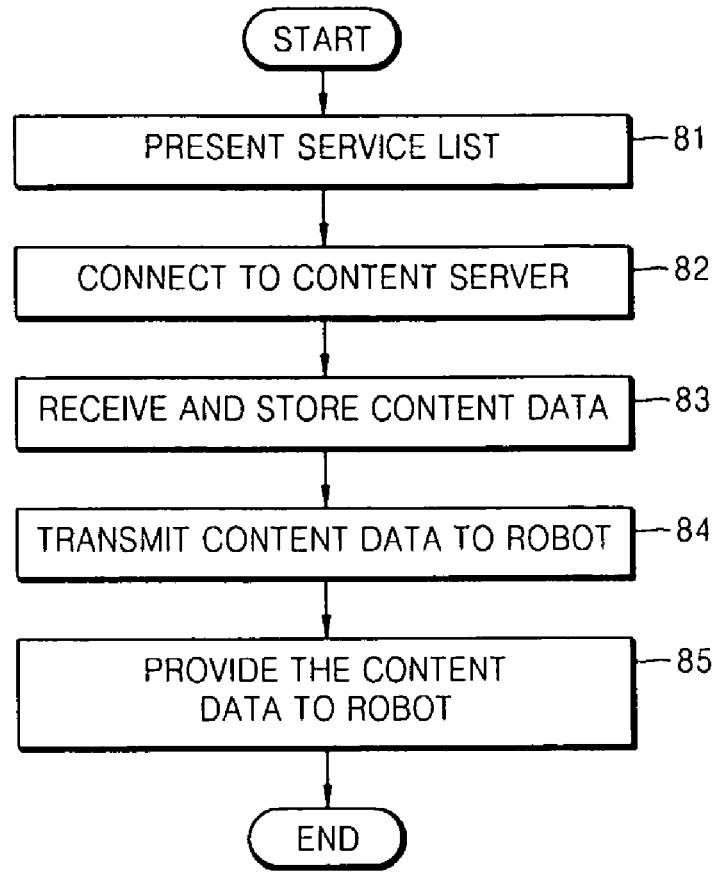
FIG. 8 is a flowchart of a method for servicing content according to an embodiment of the present invention.

FIG. 8 is a flowchart of a method for providing content according to an embodiment of the present invention. First, the robot 10 presents a content list to be supplied to a user and receives a user command through speech, buttons or a touch screen mounted on the robot 10 (operation 81). The robot 10 transmits the user command to the user command executing unit 6331 of the robot server 13. The user command executing unit 6331 is connected to the content server 634 to perform the user command (operation 82). The content packet manager 634 receives the content data for a service requested by the user from the content server 14 and stores the content data in a buffer (not shown) sequentially while maintaining the connection (operation 83).

Figure 9A:
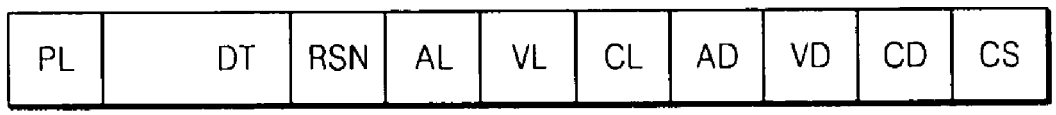
FIGS. 9A and 9B show structures of a content packet and a system command packet for transmitting and receiving content data between a user command executing unit or local service executing unit and a content server.
Figure 9B:
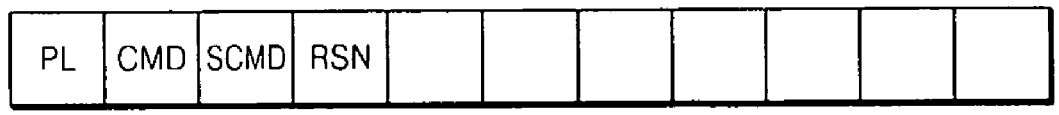

FIGS. 9A and 9B show the structures of a content packet and a system command packet for transmitting and receiving content data between the user command executing unit 6331 or the local service executing unit 6332 and the content server 14. In FIGS. 9A and 9B, PL is a field for a packet length, and DT is a field for a command (CMD), or subcommand (SCMD). RSN is a field for the serial number of the robot 10, AL is a field for an audio length, and CL is a field for the length of control data. AD is a field for audio data, VD is a field for video data, and CD is a field for control data. CS is a field for a checksum for checking whether an error occurs in the packet.

The content packet manager 634 reads the stored content data in accordance with the size of a buffer and the channel connection status with the robot 10, converts the content data into data with the format illustrated in FIG. 9A, and transmits the converted data to the robot 10 (operation 84). For example, when a buffer and a channel bandwidth are small, the content packet manager 634 prevents an overflow by delaying transmission of the content data from the content server 13. The robot 10 provides the received content packet to the user through a speaker or display device (operation 85).

As another example of the content service, the local service executing unit 6332 may connect to the content server 14 as in operation 81 in order to provide content that is frequently used by a user according to the aforementioned learning operation, at a predetermined time period in a day or after no user command is received for a predetermined time period.

Similarly, operations 82 and 85 are performed between the local service executing unit 6332 and the content packet manager 634.

As described above, the robot 10 communicates with the robot server 14 wirelessly, and the robot server 13 communicates with the content server 14 on a wire. In a current network environment, a wireless communication has a considerably lower transmission speed and more frequent packet loss than a wired communication. Accordingly, the wired communication between the robot server 13 and the content server 14 requires transmission control of packet data. Otherwise, when retransmission is needed in the wireless section between the robot server 13 and the robot 10, the packet data in the wired section increases. In this case, the packet data in the wired section cannot be stored due to limitations of storage space, and accordingly, an out-of-memory error occurs. For example, even though all the packet data in the wired section can be stored, when a real-time service for conversation or real-time transmission of the content data needs to be performed, it is a problem that past data is transmitted to the robot 10.

Accordingly, in the present invention, to solve the aforementioned problems, the content packet manager 634 stores the content data in the buffer and controls transmission. The size of the buffer is determined depending on the type and processing capability of the robot 10.

Figure 10A:
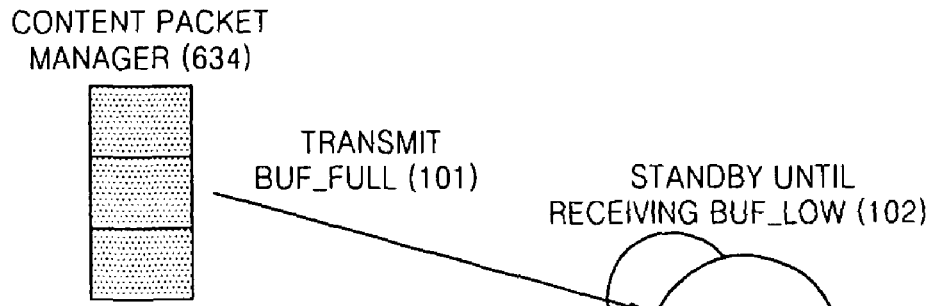
FIG. 10A shows a buffer synchronization protocol when a buffer employed by the present invention is full.

FIG. 10A shows a buffer synchronization protocol when a buffer employed by the present embodiment is full. Referring to FIG. 10A, when the buffer is full, the content packet manager 634 transmits BUF_FULL to the content server 14 (operation 101), and the content server 14 is on standby until receiving BUF_LOW (operation 102).

Figure 10B:
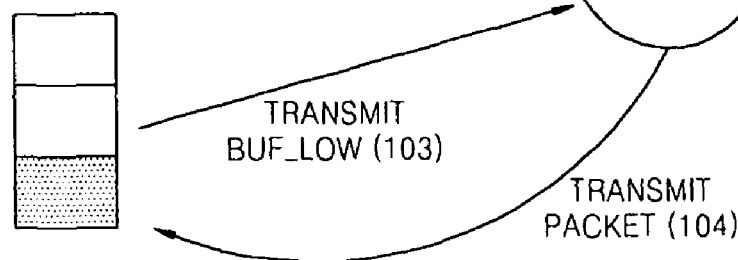
FIG. 10B shows a buffer synchronization protocol when a buffer employed by the present invention is empty or partially filled.

FIG. 10B shows a buffer synchronization protocol when a buffer employed by the present embodiment is empty or partially filled. Referring to FIG. 10B, when the buffer is empty, the content packet manager 634 transmits BUF_LOW to the server 14 (operation 103), and the content server transmits the packet (operation 104).

The present invention employs the buffer synchronization protocol because a data storage resource (not shown) is limited. In addition, even though the data can be stored in a storage unit, a service for a real-time conversation with a user may not be suitably provided due to a processing delay caused by a large amount of content data, and in a one-direction streaming service transmission such as radio streaming, it is difficult to provide the real-time service due to a large amount of data.

The buffer synchronization protocol can also be applied to communication between the robot 10 and the content packet manager 634. Specifically, the content packet manager 634 receives a signal representing a buffer status from the robot 10, and then controls transmission of the content data to prevent overflow of the buffer.

Figure 11:
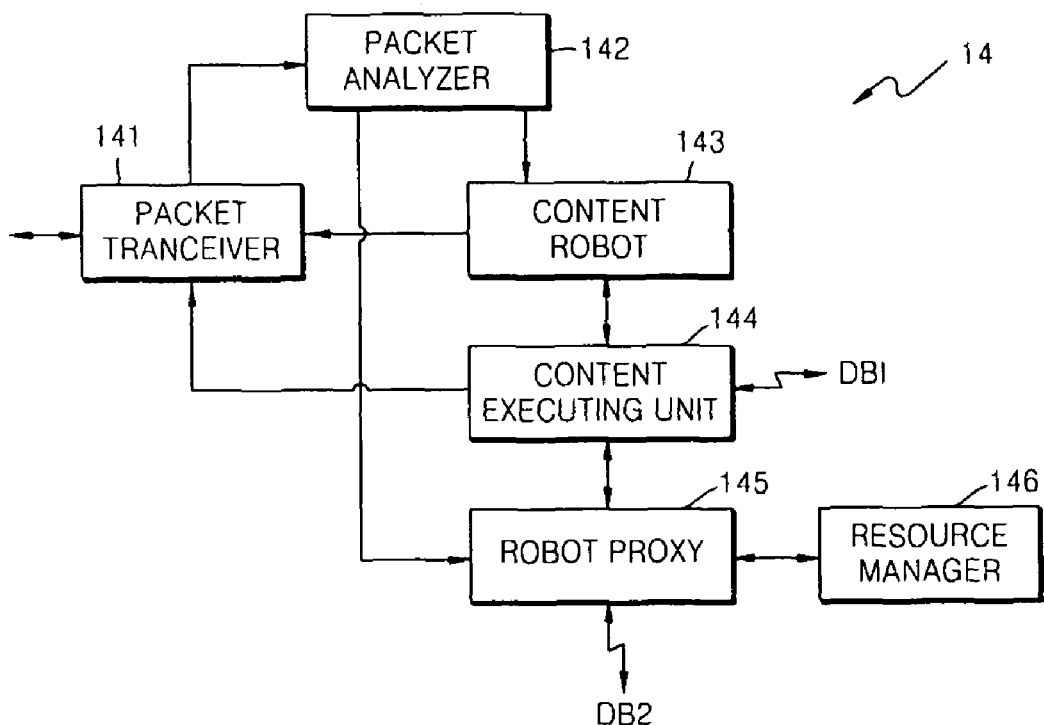
FIG. 11 is a detailed block diagram of a content server 14.

FIG. 11 is a detailed block diagram of the content server 14. Referring to FIG. 11, the content server 14 includes a packet transceiver 141, a packet analyzer 142, a content robot 143, a content executing unit 144, and a robot proxy 145. In addition, the content server 14 further includes a resource manager 146 to provide a speech recognition, speech conversion, or TTS function.

The packet transceiver 141 transmits and receives packets to and from the content packet manager 634 of the robot server 13, and the packet analyzer 142 analyzes the type or contents of the packets received through the packet transceiver 141. Each packet has the structure illustrated in FIG. 9A or 9B, and conveys a command such as a content request or a start of content execution with a corresponding field filled with a proper value.

The content robot 143 performs a command according to the analyzed result of the packet analyzer 142. For example, the content robot 143 manages a life cycle of a content, such as a start, stop, pause, restart, or sensing of a communication status of the content, according to a command. The content executer 144 loads the requested content from an external DB1, executes the content, and transmits the content to the content packet manager 634 through the packet transceiver 141. The robot proxy 145 reads from external DB2 and stores information on sensors included in the robot 10, information on an actuator driving the robot 10 and information on the other devices of the robot 10 such as processor feature, etc., for the content service on the basis of information on the robot 10 received through the packet analyzer 142 transmitted through the packet analyzer 142, and provides the stored information to the content executing unit 144 to enable the content service tailored to the robot 10. A content developer develops content including the robot proxy 303 in a standard API or XML format.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the internet. The computer readable recording medium can also be distributed over network coupled computer systems so that the computer readable code is stored and executed in a distributed fashion.

According to an embodiment of the present invention, not only a high priced robot capable of collecting, analyzing and self-processing sensor information, but a low priced robot can control other robots or provide the content service to the user. For example, it is possible to remotely control a plurality of robots without changing the server system structure, and provide services from a streaming service such as a music service or a fairy tale narration service to a high quality entertainment service requiring a large processing capability through the robot server.

In addition, the user command is analyzed and executed by the robot server that communicates with the robot, while the content data is generated and executed by the content server and then transmitted to the robot through the robot server. Accordingly, the robot server can provide a differentiated service for the same content by reprocessing and amending the content data.

While the present invention has been particularly shown and described with reference to exemplary embodiments thereof, it will be understood by those of ordinary skill in the art that various changes in form and detail may be made therein without departing from the spirit and scope of the present invention as defined by the appended claims.

What is claimed is:

1. A robot server adapted to communicate with a robot, the robot server comprising:
a virtual robot object manager (VROM) arranged to generate a virtual robot object (VRO) corresponding to the robot and the VROM arranged to activate the VRO when the VROM is in communication with the robot; and
the VRO arranged to execute commands received from the robot and the VRO arranged to control the robot, the VRO comprises:

a robot proxy (RProxy) arranged to include a communication protocol and data processing scheme according to a type of the robot and the RProxy arranged to communicate with the robot; and a virtual object executing unit (VOEU) arranged to transmit content data to the robot in response to the received commands from the robot through the RProxy and the VOEU arranged to perform a service for managing the robot, wherein the VOEU comprises:

a user command executing unit (UCEU) arranged to transmit content data to the robot through the RProxy in accordance with a user command from among the received commands; and a local service executing unit (LSEU) arranged to manage status of the robot including managing sensor data according to the received commands and the LSEU arranged to provide service including protection in accordance with robot motion communicated to the robot through the RPoxy, wherein the LSEU services content data to the robot in accordance with a predetermined condition by learning a pattern of the user command even when there is no user command.

2. The robot server of claim 1, wherein content data is provided by a content server in communication with the robot server such that the content server is adapted to store storing a plurality of contents.

3. The robot server of claim 1, further comprising a content packet manager (CPManager) that includes a buffer, the CPManaqer adapted to receive content data in a predetermined unit, the CPManager adapted to store received content data to the buffer, and the CPManager adapted to provide stored content data to the robot.

4. The robot server of claim 1,
wherein the VROM further comprises a storage unit storing programs for a plurality of robot proxies corresponding to various types of robots, and the VROM is adapted to analyze the type of the robot and the VROM is adapted to install a program for the RProxy corresponding to the type of the robot when a connection request is received from the robot.

5. The robot server of claim 1, further comprising an authentication unit (AU) analyzing an authentication data to obtain information on the robot, and the AU adapted to activate the VRO corresponding to the robot through the VROM using the obtained information subsequent to when receiving the authentication data from the robot.

6. The robot server of claim 5, wherein the authentication data includes a serial number of the robot, a command for representing an authentication request, a model number of the robot acquired through the serial number of the robot, and an IP address of the robot.

7. A content service system for providing content service to a robot, the system comprising:

a content server (CServer) arranged to store a plurality of contents and the CServer arranged to transmit a requested content data (RCData) when content service is requested; and a robot server (RServer) arranged to receive a request for the content service (RCService) from the robot, the RServer arranged to connect to the CServer, the RServer arranged to receive the RCData, and the RServer arranged to transmit the RCData to the robot, wherein the RServer comprises:

a virtual robot object manager (VROM) arranged to generate a virtual robot object (VRO) in correspondence to the robot and the VROM arranged to activate the VRO when the VROM is connected to the robot; and the VRO arranged to analyze the RCService received from the robot, to transmit the RCService to the CServer, the VRO arranged to receive the RCData from the CServer, and the VRO arranged to transmit the RCData to the robot, wherein the VRO comprises:

a robot proxy (RProxy) arranged to include a communication protocol and data processing scheme according to a type of the robot, and the RProxy arranged to communicate with the robot; and a virtual object executing unit (VOEU) arranged to transmit the RCService received through the RProxy to the CServer, the VOEU arranged to receive the RCData from the CServer, and the VOEU arranged to transmit the RCData to the robot, wherein the VOEU provides corresponding content data to the robot when a predetermined condition is satisfied even when there is no RCService from the robot.

8. The system of claim 7, wherein the CServer comprises:
a packet analyzer arranged to analyze a packet according to the RCService;
a content robot arranged to execute a command for managing a lifecycle of the RCService according to the analyzed result of the packet; and
a content executing unit (CEUnit) arranged to execute the RCService and transmit the RCdata to the RServer.

9. The system of claim 8, wherein the RProxy which is needed for receiving the RCService, and the RProxy is adapted to provide information on devices included in the robot to the CEUnit.

10. The system of claim 7 further comprising a content packet manager (CPManager) arranged to include a buffer, the CPManager adapted to receive the RCData in a predetermined unit, the CPManager adapted to store the received RCData to the buffer, and the CPManager adapted to provide the stored RCData to the robot.

11. The system of claim 8, further comprising an authentication server arranged to authenticate the robot when the robot is connected to the RServer in order to request the RCService.

12. The system of claim 11, wherein the authentication server comprises:
a packet checker arranged to determine whether each field value included in the packet is valid by analyzing the packet transmitted from the robot to the RServer; and
a controller arranged to determine whether the robot has ever been connected to the RServer before, and the controller arranged to connect to the RServer using a previous address and port number or a newly obtained address and port number, on the basis of the determined result.

13. The system of claim 12, wherein the packet transmitted to the RServer includes a plurality of fields for representing a serial number of the robot, a connection request time, a connection request type, the address and port number of the robot server.

14. A method of providing content service to a robot from a content service system, the method comprising:
receiving a request for content service (RCService) from the robot at a content server (CServer) of the content server system in which the CServer is arranged to store a plurality of contents;
transmitting from the CServer to a robot server (RServer) a corresponding requested content data (RCData) when the RCService is requested;
transmitting from the RServer to the robot the RCData, wherein the RServer comprises:

a virtual robot object manager (VROM) arranged to generate a virtual robot object (VRO) in correspondence to the robot and the VROM arranged to activate the VRO when the VROM is connected to the robot; and the VRO arranged to analyze the RCService received from the robot, to transmit the RCService to the CServer, the VRO arranged to receive the RCData from the CServer, and the VRO arranged to transmit the RCData to the robot, wherein the VRO comprises:

a robot proxy (RProxy) arranged to include a communication protocol and data processing scheme according to a type of the robot, and the RProxy arranged to communicate with the robot; and a virtual object executing unit (VOEU) arranged to transmit the RCService received through the RProxv to the CServer, the VOEU arranged to receive the RCData from the CServer, and the VOEU arranged to transmit the RCData to the robot, wherein the VOEU provides corresponding content data to the robot when a predetermined condition is satisfied even when there is no RCService from the robot.

15. The method of claim 14, further comprising authenticating the robot prior to transmitting from the RServer to the robot the RCData.

16. The method of claim 15, wherein the authentication of the robot comprises:

receiving the RCService from the robot and analyzing the received RCService;

obtaining an address and port number of a corresponding RServer to be connected to the robot and connecting the corresponding RServer to the robot, when the RCService is valid; and receiving at the corresponding RServer an authentication packet from the CServer verifying the authenticity of the robot.

17. The method of claim 16, wherein obtaining the address and port number of the robot server comprises:

determining whether or not the robot has ever been previously connected to the RServer;

reading a stored address and port number corresponding to the robot when the robot is determined to have been previously connected to the RServer; and obtaining a new address and port number of the robot server RServer when the robot is determined to have not been previously connected to the RServer.

18. The method of claim 14, wherein the CServer comprises:

a packet analyzer arranged to analyze a packet according to the RCService;

a content robot arranged to execute a command for managing a lifecycle of the RCService according to the analyzed result of the packet; and a content executing unit (CEUnit) arranged to execute the RCService and transmit the RCdata to the RServer.

19. The method of claim 14, wherein the RProxy which is needed for receiving the RCService, and the RProxy is adapted to provide information on devices included in the robot to a content executing unit (CEUnit).

20. The method of claim 14, wherein the content service system of the method further comprises a content packet manager (CPManager) arranged to include a buffer, the CPManager adapted to receive the RCData in a predetermined unit, the CPManager adapted to store the received RCData to the buffer, and the CPManager adapted to provide the stored RCData to the robot.

21. The method of claim 14, wherein a structure of a packet RCService includes fields for representing a length of the packet, a command and a subcommand for indicating the packet for requesting the content service, and a serial number of the robot.

22. The method of claim 14, wherein a structure of a packet of the RCData includes fields for representing a length of the packet, a type of the data, a serial number of the robot, an audio length, a video length, a length of control data, and a checksum.

* * * * *